(12) United States Patent
Bodum

(10) Patent No.: US 11,865,751 B2
(45) Date of Patent: Jan. 9, 2024

(54) METHOD FOR PRODUCING A DOUBLE WALLED DRINKING VESSEL

(71) Applicant: Pi-Design AG, Triengen (CH)

(72) Inventor: Jørgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 0 days.

(21) Appl. No.: 18/103,420

(22) Filed: Jan. 30, 2023

(65) Prior Publication Data

US 2023/0166436 A1    Jun. 1, 2023

Related U.S. Application Data

(62) Division of application No. 16/756,403, filed as application No. PCT/EP2018/078819 on Oct. 22, 2018, now Pat. No. 11,584,054.

(30) Foreign Application Priority Data

Nov. 3, 2017    (DE) ..................... 10 2017 125 709.8

(51) Int. Cl.
*B29C 45/16*    (2006.01)
*B29C 45/26*    (2006.01)
(Continued)

(52) U.S. Cl.
CPC ........ *B29C 45/1635* (2013.01); *B29C 45/162* (2013.01); *B29C 45/1628* (2013.01);
(Continued)

(58) Field of Classification Search
CPC .............. B29C 45/162; B29C 45/1635; B29C 45/1628; B29C 2045/1637
See application file for complete search history.

(56) References Cited

U.S. PATENT DOCUMENTS 4,362,685 A * 12/1982 Simioni .................. B29C 39/08
                                                                    264/297.3
4,885,121 A * 12/1989 Patel ...................... B62D 25/24
                                                                    425/134
(Continued)

FOREIGN PATENT DOCUMENTS

CN        1553873 A    12/2004
DE        60003117 T2   2/2004
(Continued)

OTHER PUBLICATIONS

Search Report dated Aug. 3, 2018 in DE Application No. 102017125709. 8.

(Continued)

*Primary Examiner* — Edmund H Lee
(74) *Attorney, Agent, or Firm* — Panitch Schwarze Belisario & Nadel LLP

(57) ABSTRACT

An injection mold for producing a double walled drinking vessel includes first and second mold portions. The first mold portion forms a first and second cavities corresponding to the outer shape of the outer container and the outer shape of the inner container, respectively. The first and second cavities are located concentrically with respect to a central axis. An index plate is rotatable and axially movable along the central axis relative to the first mold portion. The index plate includes a first core and a second core. The first cavity has a first cavity injection gate for injecting mold material into the first cavity for forming the outer container. The second cavity has a second cavity injection gate for injecting mold material into the second cavity for forming the inner container. The first cavity has a further injection gate for injecting joint material for joining the outer and inner containers.

3 Claims, 7 Drawing Sheets

(51) Int. Cl.
    B29K 101/12    (2006.01)
    B29L 31/00    (2006.01)
(52) U.S. Cl.
    CPC ...... *B29C 45/2681* (2013.01); *B29K 2101/12* (2013.01); *B29L 2031/7132* (2013.01)

(56) References Cited

U.S. PATENT DOCUMENTS

| | | | | |
|---|---|---|---|---|
| 5,413,743 | A * | 5/1995 | Prophet | B29C 70/845 264/297.3 |
| 5,756,013 | A * | 5/1998 | Yanagihara | B29C 45/1615 264/297.3 |
| 6,036,908 | A * | 3/2000 | Nishida | B29C 45/1671 264/254 |
| 6,299,816 | B1 * | 10/2001 | Takemoto | B29C 45/0062 264/297.3 |
| 6,558,599 | B1 * | 5/2003 | Bethune | B29C 45/1679 264/297.3 |
| 2004/0212120 | A1 * | 10/2004 | Giraud | B29C 66/341 264/102 |
| 2005/0100697 | A1 | 5/2005 | Sandstrom et al. | |
| 2015/0076735 | A1 * | 3/2015 | Moyer, II | B29C 45/06 264/297.3 |
| 2015/0313392 | A1 | 11/2015 | Melton | |
| 2016/0007783 | A1 * | 1/2016 | Melton | B65D 81/3869 264/250 |
| 2017/0095954 | A1 | 4/2017 | Gaudin | |
| 2017/0129686 | A1 | 5/2017 | Melton et al. | |

FOREIGN PATENT DOCUMENTS

| | | |
|---|---|---|
| DE | 202005001019 U1 | 3/2006 |
| EP | 1252009 B1 | 6/2005 |
| GB | 2172837 A | 10/1986 |
| JP | 2004524882 A | 8/2004 |
| JP | 2009107300 A | 5/2009 |
| WO | 0249924 A2 | 6/2002 |
| WO | 2004103676 A2 | 12/2004 |
| WO | 2015091003 A1 | 6/2015 |
| WO | 2016083226 A1 | 6/2016 |

OTHER PUBLICATIONS

Int'l Search Report dated Feb. 15, 2019 in Int'l Application No. PCT/EP2018/078819.
"Billion: Application in IMA assembly injection molding for thermo cups," Plasticker-News, Sep. 30, 2015, downloaded from web page: https://plasticker.de/news/printnews.php, Download date: Mar. 26, 2020, originally posted Oct. 17, 2015, 5 pages with translation.
Office Action dated Feb. 2, 2021 in European Application No. EP 18795960.6.
Office Action dated Mar. 30, 2021 in CN Application No. 201880071425.8.
Office Action dated May 25, 2021 in JP Application No. 2020524146.

* cited by examiner

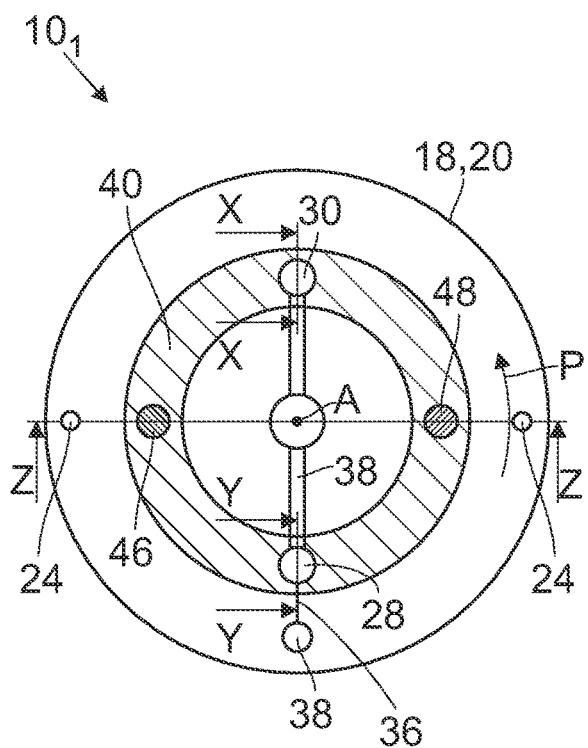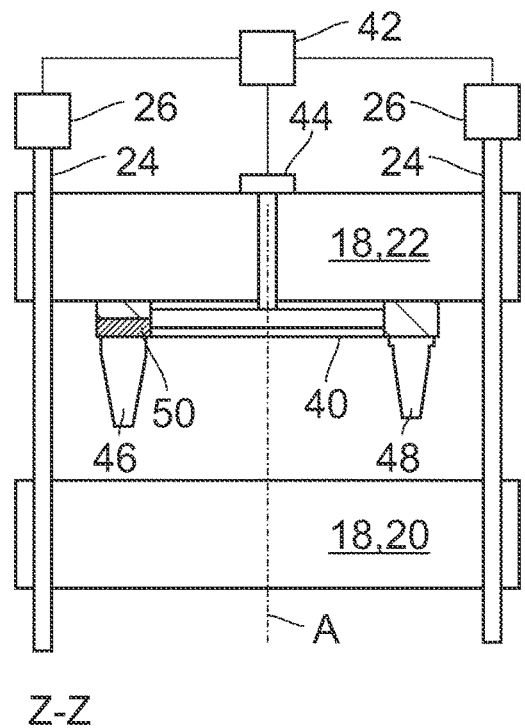
Fig.1a　　　　　　　　Fig.1b
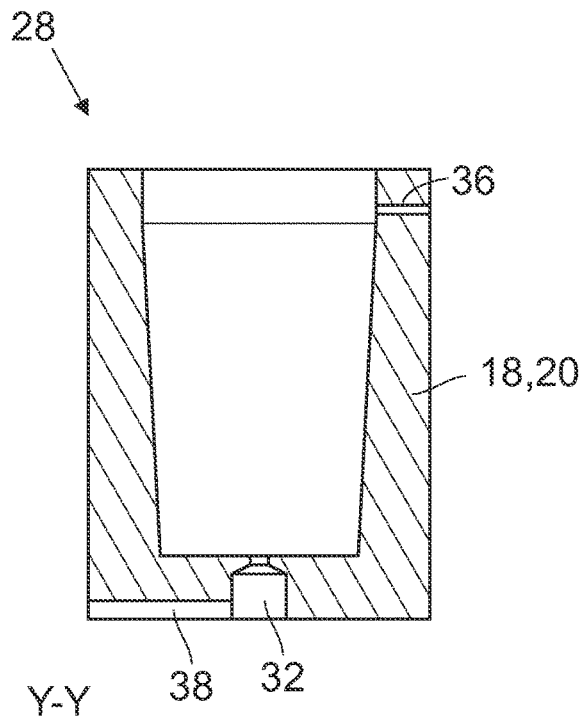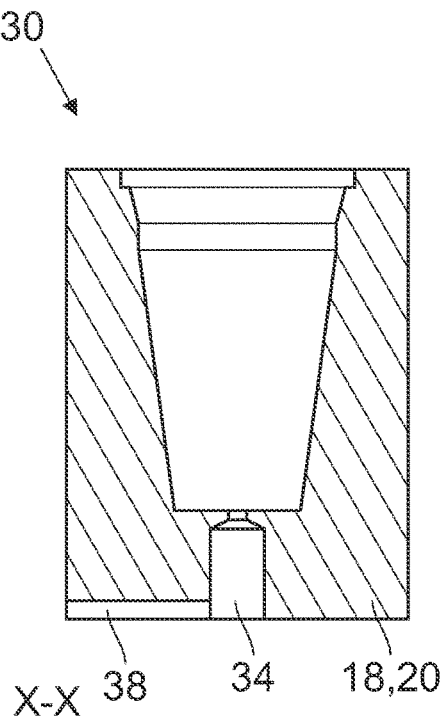
Fig.1c　　　　　　　　Fig.1d

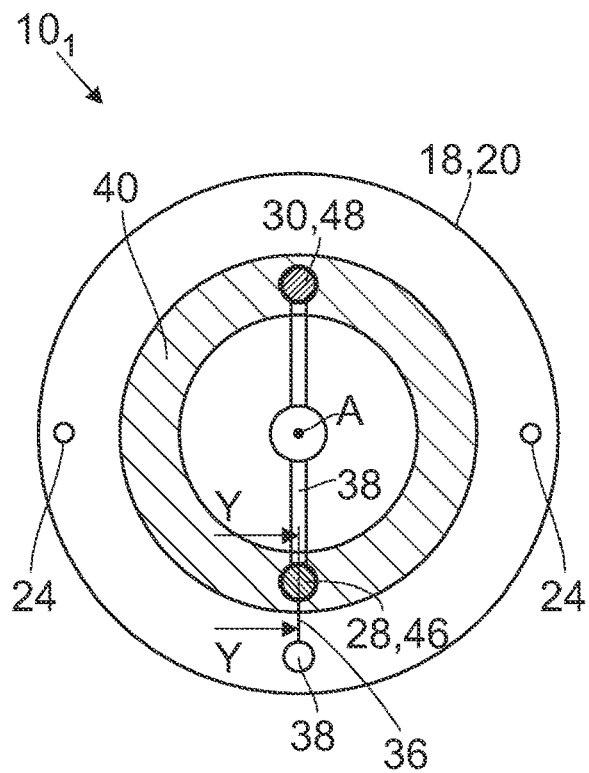 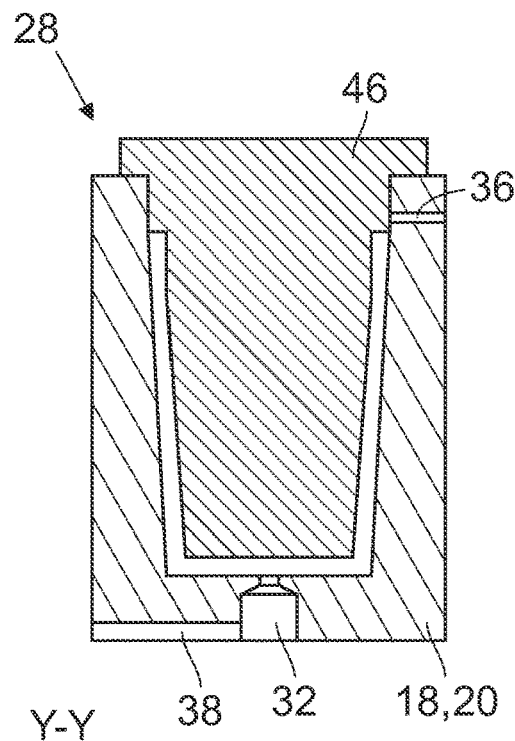
Fig.2a    Fig.2b
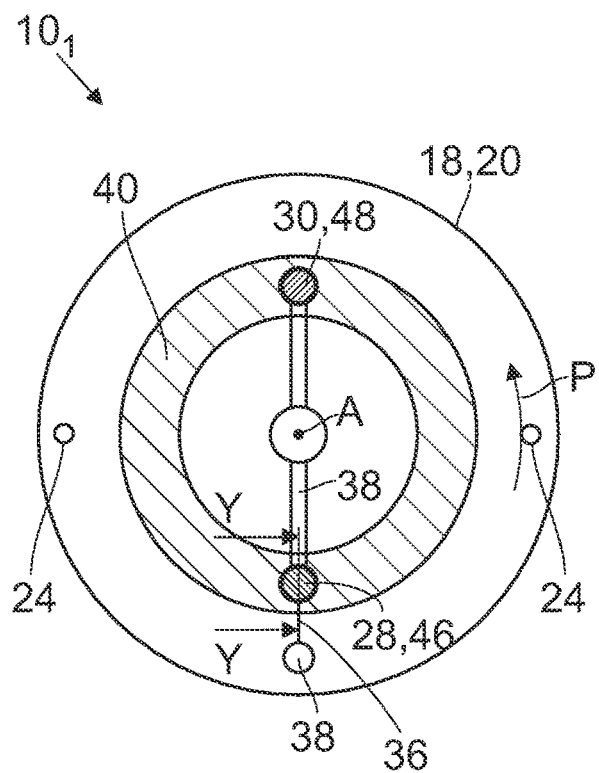 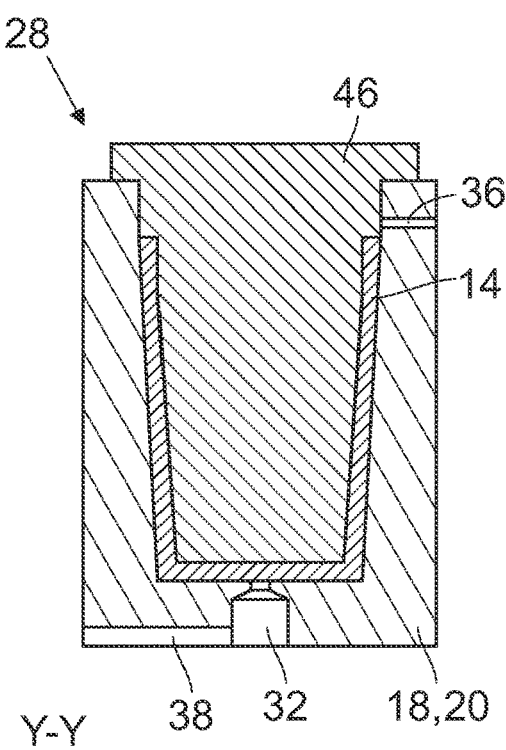
Fig.3a    Fig.3b

METHOD FOR PRODUCING A DOUBLE WALLED DRINKING VESSEL

CROSS-REFERENCE TO RELATED APPLICATION

This application is a Divisional of U.S. patent application Ser. No. 16/756,403, now U.S. Pat. No. 11,584,054, filed Apr. 15, 2020, which is a Section 371 of International Application No. PCT/EP2018/078819, filed Oct. 22, 2018, which was published in the English language on May 9, 2019 under International Publication No. WO 2019/086280 A1, which claims priority under 35 U.S.C. § 119 to German Patent Application No. 10 2017 125 709.8, filed on November 3, 2017 the disclosures of all of which are incorporated herein by reference.

BACKGROUND OF THE INVENTION

The present invention relates to an injection mold and a method for producing a double walled drinking vessel, the double walled drinking vessel comprising an outer container and an inner container.

Double walled drinking vessels comprising an outer container and an inner container in many cases encase a hollow space between them. The air captured in that hollow space has insulating properties so that the adjustment time of the temperature of the liquid inside the inner container to the ambient temperature is significantly extended compared to single wall drinking vessels. In other words cold beverages will longer stay cold and hot beverages will longer stay hot. Due to the insulating properties the hand of the user holding the vessel is exposed to the temperature of the beverage only to a limited extent. The danger that the hand gets burned or cold is reduced.

Double walled drinking vessels are for example disclosed in WO 2015/091003 A1 and WO 2016/083226 A1. In the first case the outer container is connected to the inner container by a form closure whereas in the latter case the outer container is frictionally engaged to the inner container. Another double walled drinking vessel is distributed under the trademark "Pavina". In this double walled drinking vessel the outer and inner container are injection molded and welded together by ultrasonic welding. A certain disadvantage of this way to connect the outer and the inner container to each other is that the weld seam may not be abso-lutely tight so that despite a proper mechanical connection air and water may ingress into the hollow space, in particular when the vessel is cleaned by means of a dishwasher. The water may condense inside the hollow space leading to a disadvantageous appearance.

It is one task of one embodiment of the present invention to present an injection mold and a method for producing a double walled drinking vessel leading to an improved connection between the outer container and the inner container of a double walled drinking vessel.

BRIEF SUMMARY OF THE INVENTION

The task is solved by an injection mold according to the preferred claimed invention, an injection molding machine according to the preferred claimed invention, a method according to the preferred claimed invention and a double walled drinking vessel according to the preferred claimed invention. Advantageous embodiments are subject of the sub-claims.

One embodiment of the invention is directed to an injection mold for producing a double walled drinking vessel, the double walled drinking vessel comprising an outer container and an inner container, the injection mold comprising at least one first mold portion, at least one second mold portion facing the first mold portion, the first mold portion and the second mold portion being axially movable relative to each other, the first mold portion forming at least one first cavity corresponding to the outer shape of the outer container and at least one second cavity corresponding to the outer shape of the inner container, the first cavity and the second cavity located concentrically with respect to a central axis of the first mold portion, an index plate rotatable around and axially movable along the central axis relative to the first mold portion, the index plate comprising at least a first core corresponding to the inner shape of the outer container and at least a second core corresponding to the inner shape of the inner container, the first cavity having a first cavity injection gate for injecting a mold material into the first cavity for forming the outer container, the second cavity having a second cavity injection gate for injecting a mold material into the second cavity for forming the inner container, and the first cavity having a further injection gate for injecting a joint material for joining the outer container and the inner container.

The injection mold comprises an index plate that comprises two different kind of cores, namely the first cores and the second cores. Moreover, the first injection mold portion comprises first cavities and second cavities. When the first cores are inserted into the first cavities, a mold material can be injected through the first cavity injection gate thereby forming the outer container. Correspondingly, the inner container is formed when the second core is inserted into the second cavity and a mold material is injected though the second cavity injection gate.

The second cores are not only used to form the inner container but also to remove the inner container from the second cavity and to introduce the inner container into the first cavity comprising the outer container by axially and rotatably moving the index plate. The second cores have thus also a transporting function. When the inner container is introduced into the first cavity and thus into the outer container, the two containers may be connected to each other by injecting a joint material into the first cavity. For this purpose the first cavity comprises a further injection gate for injecting the joint material.

The mold material is a thermoplastic resin, e.g. Tritan. The joint material may be the same thermoplastic resin, however, the joint material may also be a different thermoplastic resin or at least having a different color to provide the double walled drinking vessel with an eye-catching appearance.

Compared to the weld seam obtained by ultrasonic welding the injection of the joint material for joining the outer and the inner container to each other leads to a better bond so that the probability that water may ingress into the hollow space between the outer and the inner container is significantly reduced. Moreover, the double walled drinking vessel is completely finished when leaving the injection mold. Further production steps are not necessary which is in contrast to the connection of the outer and the inner container by ultrasonic welding. Thus the production process is accelerated and more efficient.

According to another embodiment at least the second core comprises holding means for holding the inner container on the second core and/or for releasing the inner container from the second core. As already described above the second core is used to remove the inner container out of the second cavity and to insert the inner container into the outer container and the first cavity. At the same time the outer container has to remain in the first cavity when the first core is extracted from the first cavity. To avoid that the inner container remains in the second cavity or detaches from the second core when being transferred the second core comprises the holding means. The holding means may comprise activatable suction means that produce a negative pressure between the second core and the inner container thereby attaching the inner container to the second core. The suction means may be deactivated when the inner container is introduced into the outer container. The holding means increase the process reli-ability.

In a further embodiment at least the first core is axially mounted to the index plate. As already mentioned above the second core is removed from the second cavity together with the inner container and introduced into the first cavity and the outer container. The outer container and thus the first cavity is bigger in size compared to the inner container and the second cavity. Therefore, the first core cannot or only partially be inserted into the second cavity so that the injection mold cannot be completely closed. When the second core is introduced into the second cavity the index plate is axially moved. As the first core and the second core are mounted to the same index plate, also the first core is axially moved. The axial movability avoids a damaging impact of the first core on the first mold portion.

According to a further developed embodiment the index plate comprises a preload element forcing the first core into a position in which the first core maximally protrudes from the index plate. The position in which the first core maximally protrudes from the index plate is the position which is needed to produce the outer container with the requested dimensions. The preload element ensures the first core is automatically placed back into this positon after having been displaced by the first mold portion upon closing the injection mold.

In another embodiment the first mold portion comprises a number of additional cavities that is equal to or exceeds the number of the first cavities, wherein a first core can be fully inserted into the additional cavity, the index plate comprises a number of first cores that is equal to the number of the first cavities, and the angle between a first cavity and a neighboring additional cavity is the same as between a first cavity and a neighboring second cavity. As already mentioned before the first core is axially moved in the same way as the second core as the first and the second core are both mounted to the same index plate. While the second core can be inserted into the first cavity and the second cavity the first core can due to its size not be fully inserted to the second cavity. In this embodiment the first mold portion comprises an additional cavity into which the first core can be inserted when the second core is inserted into the first cavity together with the inner container. A damaging impact of the first core on the first mold portion is thus avoided. It is not necessary to mount the first core to the index plate in an axially movable way.

Further, the additional cavities have the same structure as the first cavities. In particular the additional cavities can be identical to the first cavities so that they cannot be distinguished anymore. Thus the manufacturing process of the first mold portion is facilitated as no distinction between the first and the additional cavities has to be made. Moreover, as in this case the first cavity can be used to produce a further outer container, the productivity of the production process may be increased.

In a further embodiment the first mold portion comprises four first cavities and four second cavities equally arranged around the central axis of the first mold portion, the first cavities subdivided into two first cavity pairs and the second cavities subdivided into two second cavity pairs, the first and second cavity pairs are arranged alternately to each other, and the index plate comprises two first cores and four second cores, the two first cores being arranged opposite to each other with reference to the central axis, respectively two of the second cores being adjacently arranged to each of the first cores, the second cores enclosing an angle of 45° with the adjacent first core with reference to the central axis. As will be later explained in detail, in this embodiment two finished double walled drinking vessels can be withdrawn each time the injection mold is opened. Moreover, the index plate only needs to be rotated by 45° which contributes to a fast and efficient production process.

A further realization of the present invention is directed to an injection mold machine comprising an injection mold according to one of the embodiments presented above.

An implementation of the invention is directed to a method for producing a double walled drinking vessel, the double walled drinking vessel comprising an outer container and an inner container using an injection mold machine according to the realization mentioned before, comprising following steps:
  rotating the index plate into a position in which the first core is axially aligned with a first cavity and the second core is axially aligned with a second cavity,
  closing the injection mold by axially moving the first mold portion relative to the second mold portion, thereby inserting the first core into the first cavity and the second core into a second cavity,
  injecting a mold material into the first cavity through the first cavity injection gate, thereby forming an outer container,
  injecting a mold material into the second cavity through the second cavity injection gate, thereby forming an inner container,
  opening the injection mold by axially moving the first mold portion relative to the sec- and mold portion, such that the outer container remains in the first cavity and the inner container is removed from the second cavity by the second core,
  rotating the index plate into a position in which the second core holding an inner container is axially aligned with a first cavity comprising an outer container,
  closing the injection mold, thereby inserting the inner container into the outer container,
  joining the outer container and the inner container by injecting a joint material through the further injection gate of the first cavity, and
  opening the injection mold and ejecting the double walled drinking vessel.

The technical effects and advantages as discussed with regard to the injection mold equally apply to the injection molding machine and the method for producing a double walled drinking vessel. Briefly, the injection mold machine enables the production of a double walled drinking vessel having a water tight bond between the outer container and the inner container so that the ingress of water into the hollow space is avoided. Moreover, the double walled drinking vessel is completely finished after being withdrawn from the injection mold machine so that no further manufacturing process in particular for joining the outer container and the inner container is needed as is the case when the outer container and the inner container are welded together. The production process is thus faster and more efficient.

Another implementation of the method comprises the following steps:
- rotating the index plate into a position in which the two first cores are axially aligned with two first cavities, the two second cores are axially aligned with two second cavities and the two remaining second cores are axially aligned with two first cavities,
- closing the injection mold by axially moving the first mold portion relative to the second mold portion, thereby inserting the first cores into the first cavities, two of the second cores into the second cavities and the two remaining second cores into the two first cavities,
- injecting a mold material into the first cavities into which the two first cores are inserted through the first cavity injection gate, thereby forming two outer containers,
- injecting a mold material into the second cavities into which the second cores are inserted through the second cavity injection gate, thereby forming two inner containers,
- opening the injection mold by axially moving the first mold portion relative to the second mold portion, such that the two outer containers remain in the respective first cavities and the two inner containers are removed from the respective second cavities by the second cores,
- rotating the index plate forward by 45° into a position in which the second cores holding the two inner containers are axially aligned with the two first cavities comprising the two outer containers, the two first cores are axially aligned with two first cavities and the two remaining second cores are axially aligned with two second cavities,
- closing the injection mold, thereby inserting the two inner containers into the two outer containers, inserting the first cores into the first cavities and inserting the two remaining second cores into the second cavities,
- joining the outer container and the inner container by injecting a joint material through the further injection gate of the first cavity,
- injecting a mold material into the first cavities into which the two first cores are inserted through the first cavity injection gate, thereby forming two outer containers,
- injecting a mold material into the second cavities into which the second cores are inserted through the second cavity injection gate, thereby forming two inner containers,
- opening the injection mold such that the two outer containers remain in the respective first cavities and the two inner containers are removed from the respective sec- and cavities by the second cores,
- ejecting the two double walled drinking vessels,
- rotating the index plate backward by 45° into a position in which the second cores holding the two inner containers are axially aligned with the two first cavities comprising the two outer containers, the two first cores are axially aligned with two first cavities and the two remaining second cores are axially aligned with two second cavities, and
- closing the injection mold and starting again from the beginning.

In this implementation of the method each time the injection mold is opened two finished double walled drinking vessels can be withdrawn from the injection mold. This method requires that the first mold portion comprises in total eight cavities, namely four first cavities and four second cavities. Although the first mold portion may be provided with a higher number of cavities the increase in complexity of the first mold portion would not justify the result, in this case a higher throughput. It has been found that the use of in total eight cavities provides a high throughput at a manageable complexity.

Another implementation of the invention relates to a double walled drinking vessel, the double walled drinking vessel comprising an outer container and an inner container, the double walled drinking vessel obtained by a method according to one of the methods previously described and/or by using an injection molding machine as described before, wherein the outer container and the inner container are joined together by an injected thermoplastic resin. In known double walled drinking vessels the outer container and the inner container are joined by ultrasonic welding. However, the weld seam so obtained may not be water tight so that water may ingress into the hollow space between the outer container and the inner container and condense in the hollow space leading to a disadvantageous appearance. In the double walled drinking vessel obtained by the proposed method the outer container and the inner container are joined inside the injection molding machine by injecting a thermoplastic resin. The bond so obtained is much better so that the probability that water may ingress into the hollow space between the outer and the inner container is significantly reduced.

Another aspect of the present invention is directed to a computer program for conducting the method as previously described, wherein the computer program comprises a program code for causing the control unit to perform the steps of the method previously described, when the computer program is executed on the control unit.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings:

FIG. 1a is a cross-sectional view of a first embodiment of an injection molding machine according to the invention and FIGS. 1a-5b disclose different steps of a method by which the molding machine according to the first embodiment may be operated, by means of principle sketches;

FIG. 1b is a side view of the injection molding machine of FIG. 1a;

FIG. 1c is a cross-sectional view of a first cavity of the injection molding machine of FIG. 1a;

FIG. 1d is a cross-sectional view of a second cavity of the injection molding machine of FIG. 1a;

FIG. 2a is a cross-sectional view of the injection molding machine of FIG. 1a;

FIG. 2b is a cross-sectional view of the first cavity and a first core of the injection molding machine of FIG. 1a;

FIG. 3a is a cross-sectional view of the injection molding machine of FIG. 1a;

FIG. 3b is a cross-sectional view of the first cavity and the first core of the injection molding machine of FIG. 1a;

FIG. 4a is a cross-sectional view of the injection molding machine of FIG. 1a;

FIG. 4b is a cross-sectional view of the first cavity and a second core of the injection molding machine of FIG. 1a;

FIG. 5a is a cross-sectional view of the injection molding machine of FIG. 1a;

FIG. 5b is a cross-sectional view of the first cavity and the second core of the injection molding machine of FIG. 1a;

DETAILED DESCRIPTION OF THE INVENTION

Figure 4A:
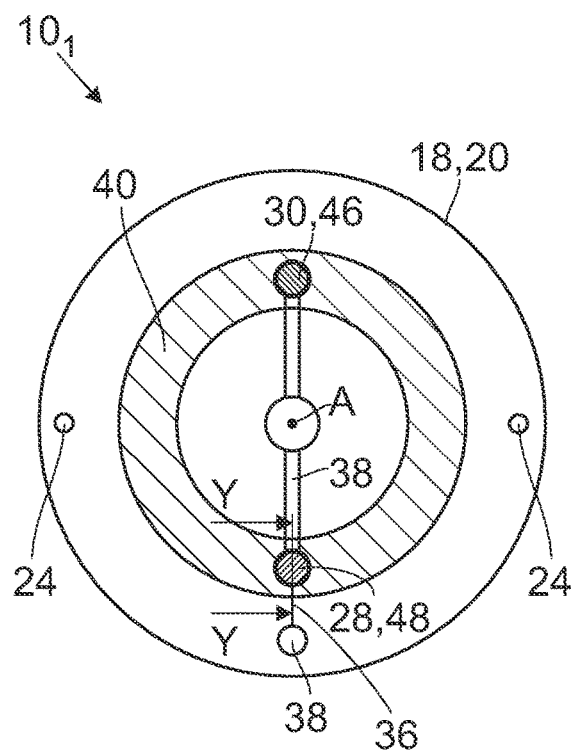

FIG. 1a shows a principle view on an injection molding machine $10_1$ according to a first embodiment and FIG. 1b a section along the section plane Z-Z as defined in FIG. 1a. For the sake of comprehensibility only the relevant parts of the injection molding machine are shown, particularly in FIG. 1a. The injection molding machine $10_1$ is configured to produce a double walled drinking vessel 12 having an outer container 14 and an inner container 16 (see FIGS. 4b and 5b).

The injection molding machine $10_1$ comprises an injection mold 18 having a first mold portion 20 and a second mold portion 22. The first mold portion 20 and the second mold portion 22 are facing each other and are axially movable along a central axis A of the injection molding machine $10_1$. To this end the first mold portion 20 and the second mold portion 22 are connected to a number of guide rods 24. Moreover the injection molding machine $10_1$ is equipped with driving means 26 for axially moving the first mold portion 20 and the second mold portion 22 along the guide rods 24.

The first mold portion 20 comprises one first cavity 28 and one second cavity 30 that are separately shown in FIGS. 1c and 1d, respectively. The first cavity 28 and the second cavity 30 are located opposite of the central axis A and thus enclose an angle of 180°. The first cavity 28 is equipped with a first cavity injection gate 32 for injecting a mold material into the first cavity 28, thereby forming the outer container 14. The second cavity 30 is ac-cordingly equipped with a second cavity injection gate 34 for injecting a mold material into the second cavity 30, thereby forming the inner container 16. The first cavity 28 comprises a further injection gate 36 for injecting a joint material into the first cavity 28. The injection molding machine $10_1$ comprises a manifold 38 for guiding the mold material to the first and second cavity injection gate 32, 34 and the joint material to the further injection gate 36.

Moreover, the injection molding machine $10_1$ comprises an index plate 40 which is mounted to the second mold portion 22 and thus movable along the central axis A together with the second mold portion 22. The index plate 40 is rotatable around the central axis A by means of a rotary drive means 44. The index plate 40 further comprises a first core 46 and a second core 48. The first core 46 has a shape defining the inner shape of the outer container 14 (see FIGS. 2b and 3b) whereas the second core 48 has a shape defining the inner shape of the inner container 16 (see FIGS. 4b and 5b).

As demonstrated in FIG. 1b the first core 46 is mounted on the index plate 40 axially movable along the central axis A. The index plate 40 comprises a preload element 50 forcing the first core 46 into a position in which the first core 46 maximally protrudes from the index plate 40.

The injection molding machine $10_1$ further comprises a control unit 42 to coordinate the movements of the first mold portion 20, the second mold portion 22 and the index plate 40 and to control the injection of the mold material and the joint material into the respective cavities.

In the following the different steps of a method will be explained by which the injection molding machine $10_1$ may be operated.

In FIGS. 1a and 1b the injection molding machine $10_1$ is opened and the index plate 40 is in a position in which neither the first core 46 nor the second core 48 are axially aligned with the first cavity 28 or the second cavity 30. As indicated by the arrow P the index plate 40 then turned counterclockwise, in this case by 90°, so that the first core 46 is axially aligned with the first cavity 28 and the second core 48 is axially aligned with the second cavity 30. This position is shown in FIG. 2a. Now the molding machine is closed thereby inserting the first core 46 into the first cavity 28, as shown in FIG. 2b, and the second core 48 into the second cavity 30 (not shown).

In remaining in this position the mold material is injected into the first cavity 28 through the first cavity injection gate 32, thereby forming an outer container 14 (FIG. 3b), and into the second cavity 30 through the second cavity injection gate 34, thereby forming an inner container 16 (not shown). The mold material may be a thermoplastic resin such as Tritan.

After the thermoplastic resin has cured the injection molding machine $10_1$ is opened by moving the first mold portion 20 and the second mold portion 22 axially away from each other along the central axis A. The second core 48 comprises holding means 52, in this case activatable suction means 54 that produce a negative pressure acting between the inner container 16 and the second core 48 (see FIGS. 4b and 5b). As a result the inner container 16 is removed from the second cavity 30 when the injection molding machine $10_1$ is opened. In contrast to that the outer container 14 remains in the first cavity 28. After that the index plate 40 is rotated by 180° and the injection molding machine $10_1$ is closed again.

When comparing the first cavity 28, e.g. shown in FIG. 1c, and the second cavity $30_2$, e.g. shown in FIG. 1d and/or when comparing the first core 46 and the second core 48, e.g. in FIG. 1b, it becomes clear that they are different in size. In consequence of that the second core 48 can completely be inserted into the first cavity 28 and the second cavity 30, whereas the first core 46 can only completely be inserted into the first cavity 28. Depending on the design of the double walled drinking vessel 12 the first core 46 may not at all or only partially be inserted into the second cavity 30. Without any countermeasures the first core 46 would impact on the first mold portion 20 and cause severe damages in the injection mold 18 when closing the injection molding machine 10₁. For preventing such damages the first core 46 is mounted on the index plate 40 axially movable along the central axis A. The preload element 50 is forcing the first core 46 into a position in which the first core 46 maximally protrudes from the index plate 40. This position is shown in FIGS. 1*b*, 2*b* and 3*b*.

Figure 4B:
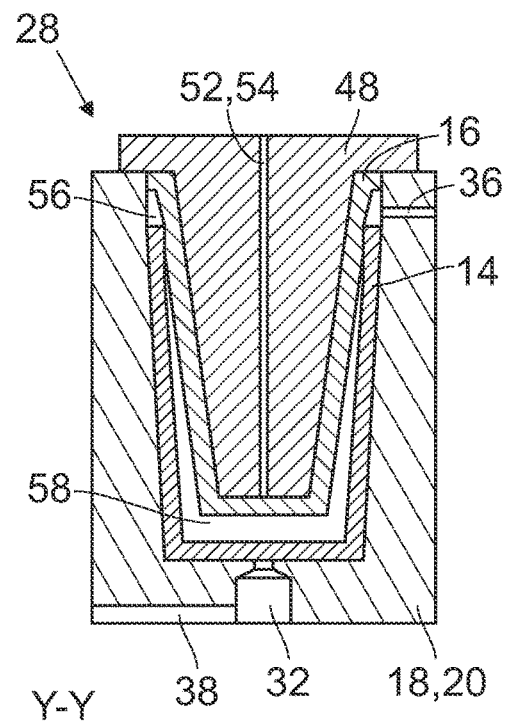

When the injection molding machine 10₁ is closed the first core 46 is axially moved against the force exerted by the preload element 50. Concomitantly the second core 48 together with the inner container 16 is inserted into the first cavity 28 and into the outer container 14 as shown in FIG. 4*b*. As evident from FIG. 4*b* the outer container 14 and the inner container 16 are configured such that an annular space 56 near the opening of the outer container 14 and the inner container 16 is created. Moreover the outer container 14 and the inner container 16 encase a hollow space 58 between them.

Figure 5A:
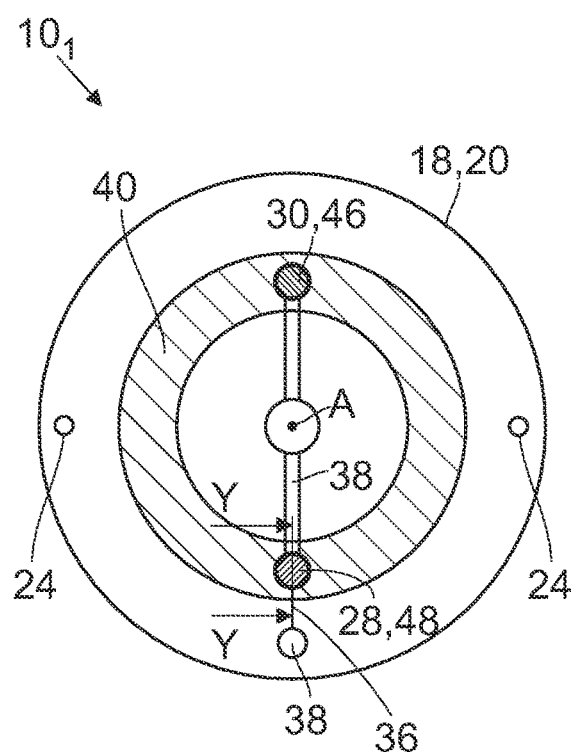
Figure 5B:
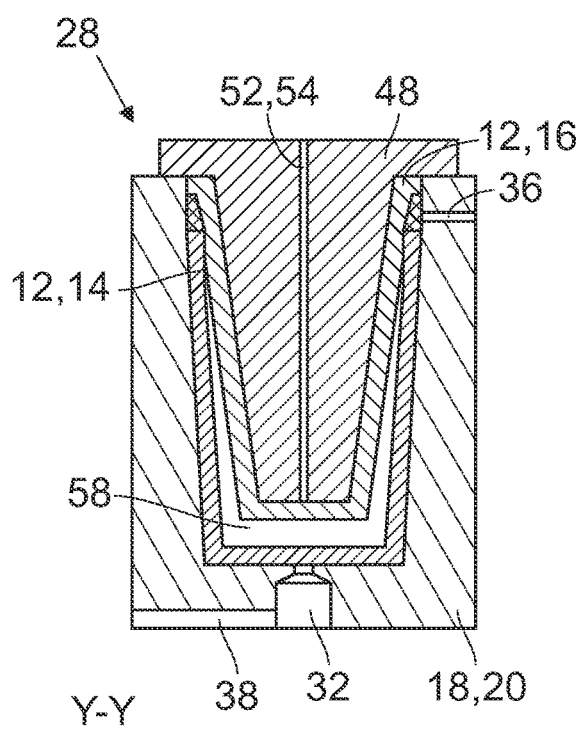

Now a joint material is injected into the first cavity 28 through the further injection gate 36 (FIG. 5*b*). The further injection gate 36 is positioned such that the joint material is injected into the annular space 56. The joint material may be a thermoplastic resin and may be identical to the thermoplastic resin used as the mold material for producing the outer container 14 and the inner container 16. After the joint material is injected into the annular space 56 and has cured the double walled drinking vessel 12 is completed as shown in FIG. 5*b*. The injection molding machine 10₁ is now opened and the double walled drinking vessel 12 is ejected.

Figure 6:
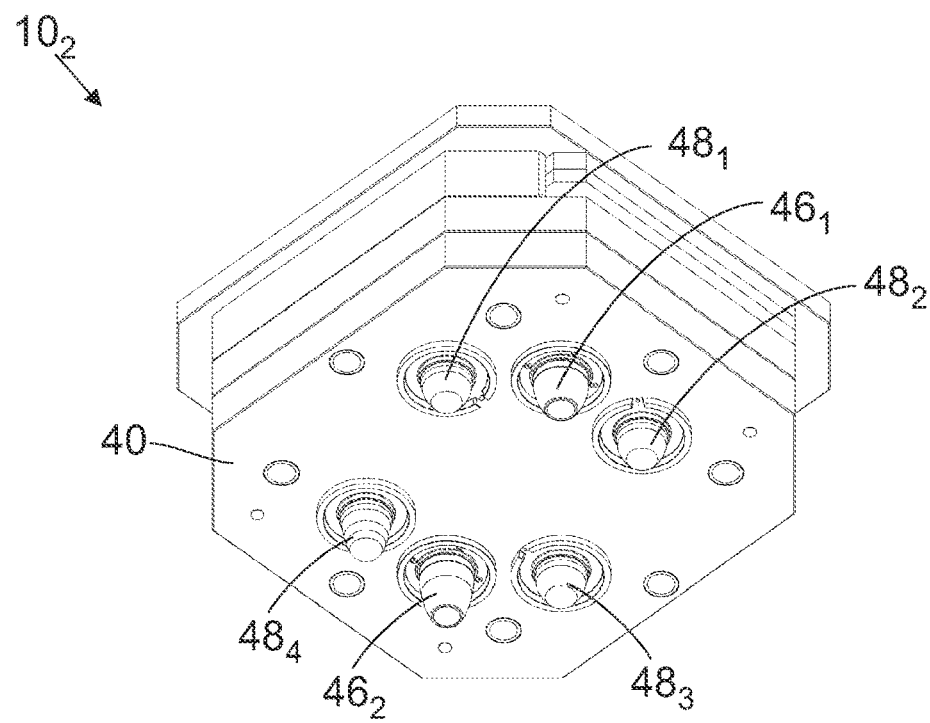
FIG. 6 is a perspective view of an index plate of a second embodiment of the molding machine according to the invention.
Figure 7:
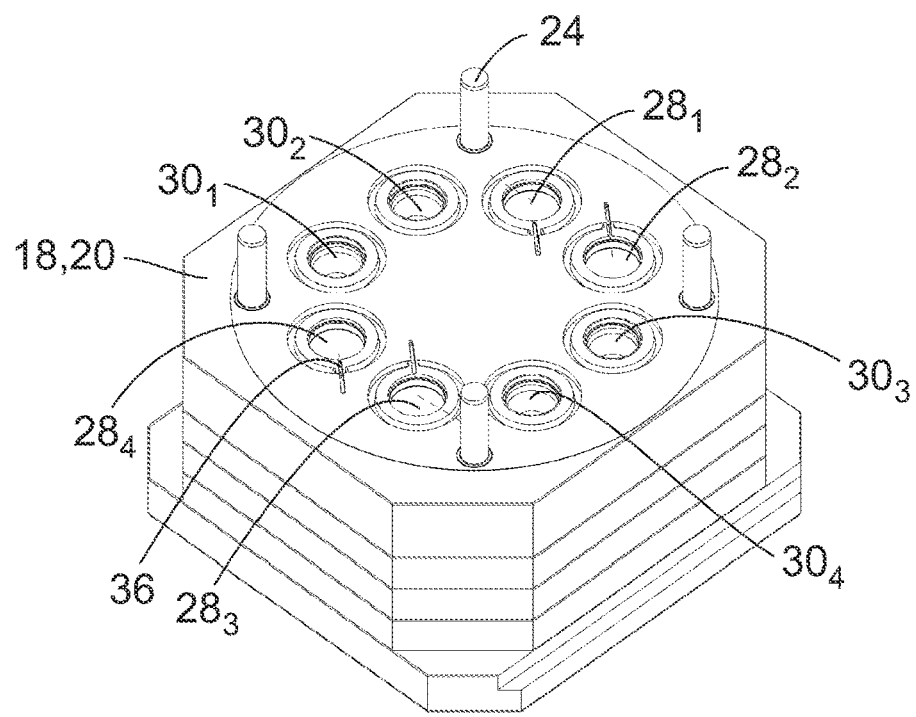
FIG. 7 is a perspective view of a first mold portion index plate of the second embodiment of the molding machine according to the invention.

In FIG. 6 the index plate 40 and in FIG. 7 the first mold portion 20 of a second embodiment of the injection molding machine 102 are shown each by means of a perspective view. In FIGS. 8 to 11 the method by which the injection mold 18 may be operated is shown comprising the index plate 40 and the first mold portion 20 illustrated in FIGS. 6 and 7.

Figure 8:
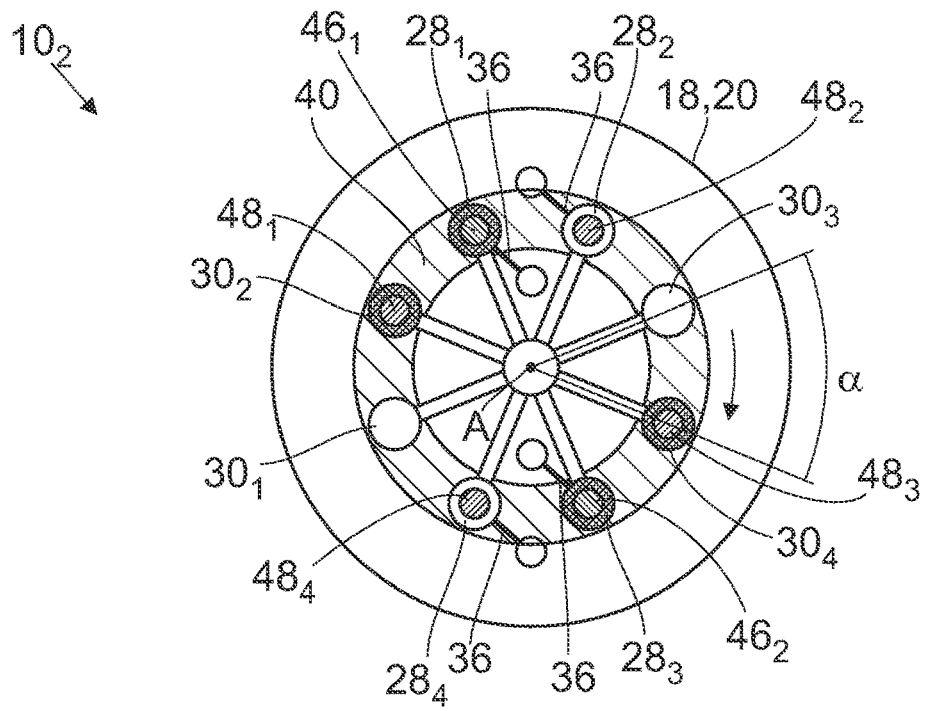
FIG. 8 is a cross-sectional view of a molding machine according to the second embodiment and FIGS. 8-11 disclose different steps of a method by which the molding machine according to the second embodiment may be operated.

Referring to FIG. 7 the first mold portion 20 comprises in total eight cavities, namely four first cavities 28₁ to 28₄ and four second cavities 30₁ to 30₄. The cavities 28, 30 are equally arranged around the central axis A so that they form an angle α of 45° as shown in FIG. 8. The first cavities 28₁ to 28₄ are grouped pairwise around the central axis A so that they form two first cavity pairs 28P1 and 28P2. The second cavities 30₁ to 30₄ are grouped pairwise around the central axis A so that they form two second cavity pairs 30P1 and 30P2. The first cavity pairs 28P1 and 28P2 are each arranged adjacent to the second cavity pairs 30P1 and 30P2. In FIG. 7 the further injection gates 36 of the first cavities 28₁ to 28₄ are clearly visible.

As shown in FIG. 6 the index plate 40 comprises two first cores 46₁, 46₂ and four second cores 48₁ to 48₄. The two first cores 46₁, 46₂ are arranged opposite to each other with reference to the central axis A. The two second cores 48₁, 48₂ are arranged adjacent to the first cores 46 and the two second cores 48₃, 48₄ are arranged adjacent to the first core 46₂, the second cores 48₁ to 48₄ enclosing an angle of 45° with the adjacent first core 46₁, 46₂ with reference to the central axis A.

The second embodiment of the injection molding machine 102 may be operated as follows. In FIG. 8 the index plate 40 is placed in a position in which the first cores 46₁, 46₂ are inserted into the first cavities 28₁, 28₃ and two of the second cores 48₁, 48₃ are inserted into the second cavities 30₂ and 30₄ whereas the remaining two second cores 48₂, 48₄ are inserted into the remaining first cavities 28₂, 28₄. The mold material is injected into the first cavities 28₁, 28₃ into which the first cores 46₁, 46₂ are inserted and into the second cavities 30₂, 30₄ into which the second cores 48₁, 48₃ are inserted. It is noted that no mold material is injected into the remaining first cavities 28₂, 28₄ into which the remaining two second cores 48₂, 48₄ are inserted. Consequently two outer containers 14 are produced in the first cavities 28₁, 28₃ and two inner containers 16 are produced in the second cavities 30₂, 30₄.

Figure 9:
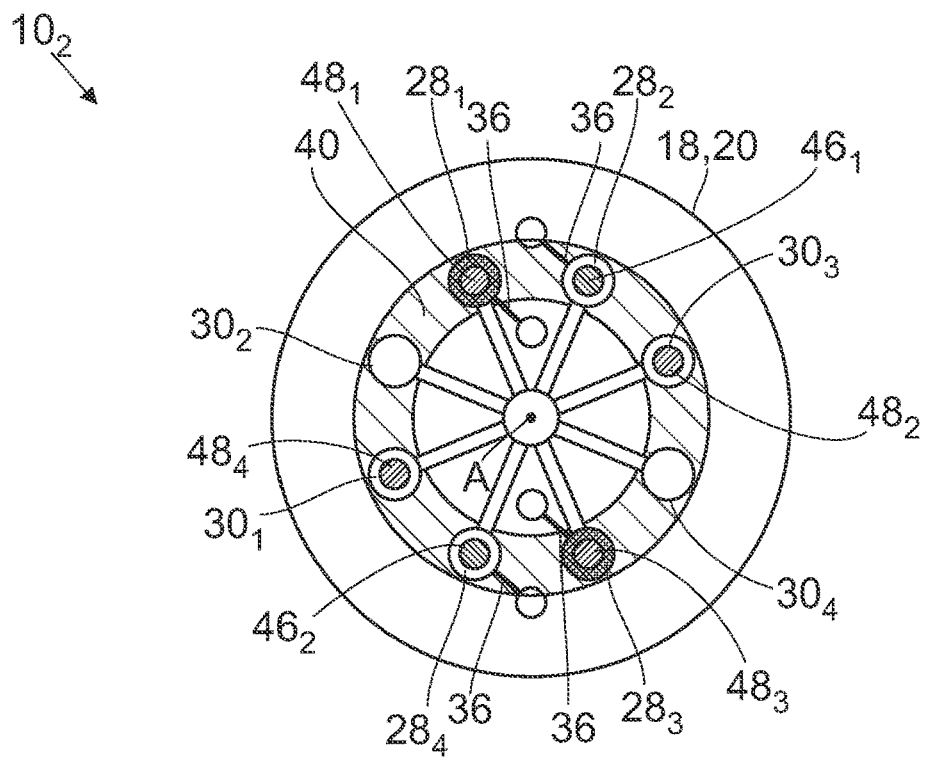
FIG. 9 is another cross-sectional view of the molding machine according to the second embodiment of FIG. 8.
Figure 10:
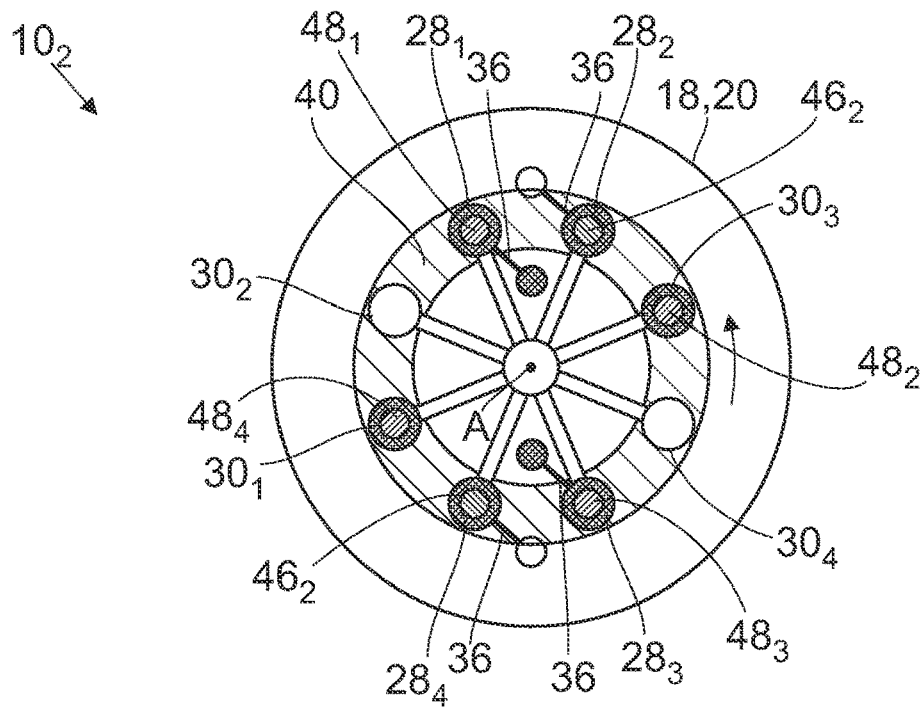
FIG. 10 is another cross-sectional view of the molding machine according to the second embodiment of FIG. 8.
Figure 11:
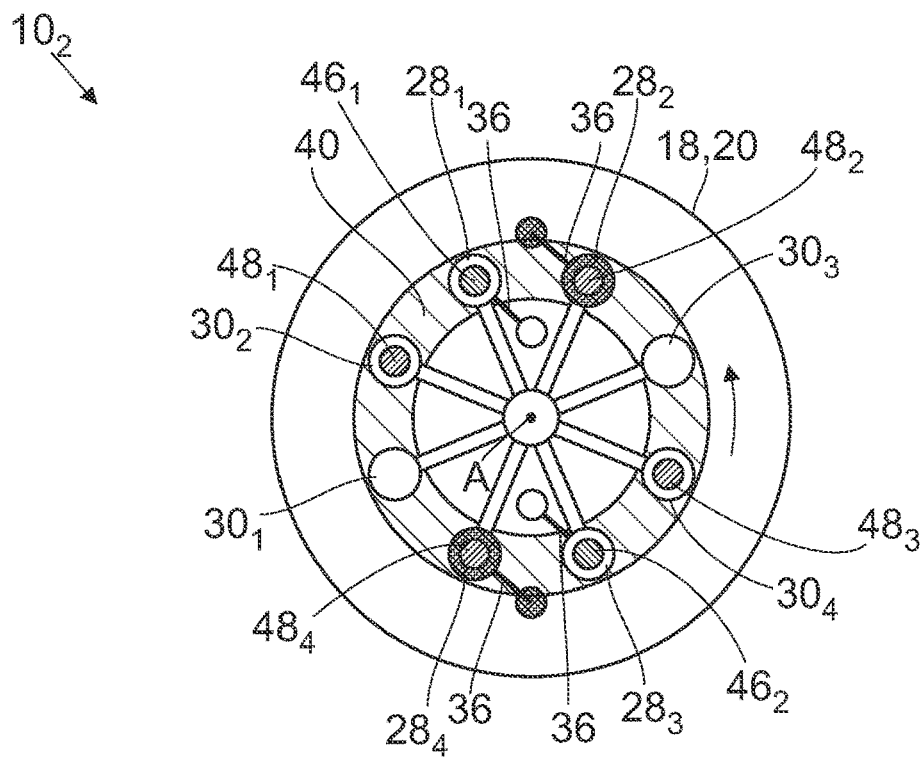
FIG. 11 is another cross-sectional view of the molding machine according to the second embodiment of FIG. 8.

Now the injection mold 18 is opened and the first cores 46₁, 46₂ and the second cores 48₁ to 48₄ are removed from the respective first and second cavities 28, 30. As already mentioned with reference to the first embodiment of the injection mold 10₁ the second cores 48₁, 48₃ also withdraw the inner containers 16 from the respective second cavities 30₂, 30₄ whereas the outer containers 14 remain inside the first cavities 28₁, 28₃. The index plate 40 is now rotated by 45° into a first rotary direction indicated by the arrow P (FIG. 9). The injection mold 18 is closed again so that by means of the two second cores 48₁, 48₃ the two inner containers 16 are introduced into the first cavities 28₁, 28₃ comprising the outer containers 14. The first cores 46₁, 46₂ are now introduced into the first cavities 28₂, 28₄ and the two remaining second cores 48₂, 48₄ are now introduced into the two second cavities 30₁, 30₃. The joint material is now injected into the first cavities 28₁, 28₃ through the further injection gates 36, thereby completing two double walled drinking vessels 12 (see FIG. 10).

At the same time the mold material is introduced into the two first cavities 28₂, 28₄ and the two second cavities 30₁, 30₃ so that two outer containers 14 and two inner containers 16 are formed. After curing the injection mold 18 is opened and the two completed double walled drinking vessels 12 are ejected. After that the index plate 40 is rotated 45° into a second rotary direction opposite of the first rotary direction as indicated by the arrow P in FIG. 10 into a position shown in FIG. 11. The injection molding machine 102 is closed and by means of the second cores 48₂, 48₄ the two inner containers 16 are introduced into the first cavities 28₂, 28₄ comprising the outer containers 14. The joint material is injected into the first cavities 28₂, 28₄ through the further injection gates 36, thereby competing two double walled drinking vessels 12. At the same time mold material is injected into the first cavities 28₁ and the second cavities 30₂, 30₄ thereby forming two outer containers 14 and two inner containers 16 as shown in FIG. 8. The described steps are now repeated.

By means of the method the injection molding machine 102 according to the second embodiment is operated two double walled drinking vessels 12 are completed and ejected each time the injection molding machine 102 is opened.

Figure 12:
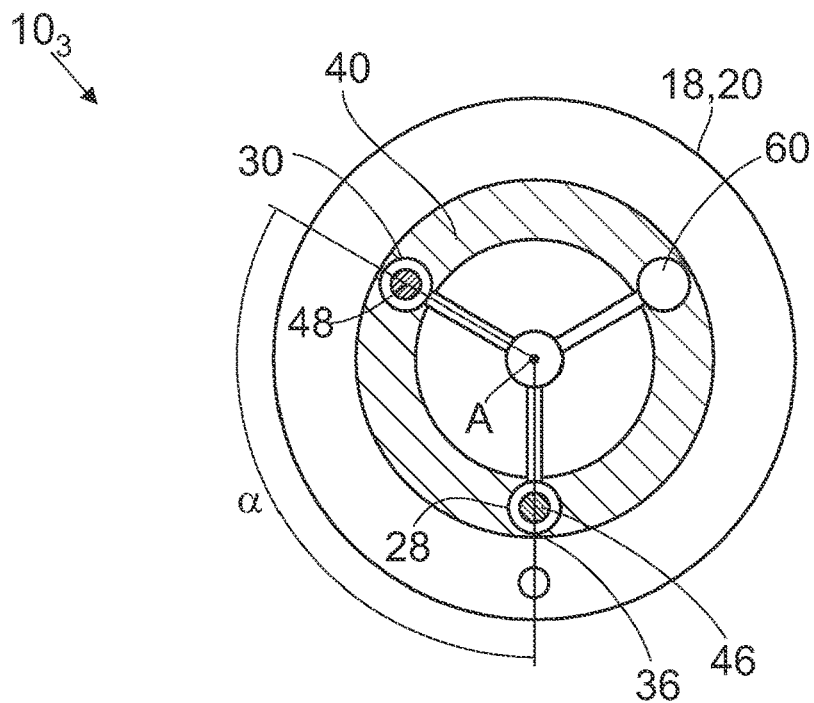
FIG. 12 is a third embodiment of an injection molding machine.

In FIG. 12 a third embodiment of an injection molding machine 10₃ is shown by means of a principle sketch. The first mold portion 20 comprises in total three cavities, namely one first cavity 28, one second cavity 30 and one additional cavity 60. The cavities 28, 30, 60 are equally arranged around the central axis A. The index plate 40 comprises one first core 46 and one second core 48 enclosing an angle α of 120° with reference to the central axis A. The additional cavity 60 is configured such that the first core 46 may be completely inserted into the additional cavity 60.

The injection molding machine 10₃ is operated as follows. The index plate 40 is rotated into a position in which the first core 46 is aligned with the first cavity 28 and the second core 48 is aligned with the second cavity 30. The injection molding machine 10₃ is closed, thereby inserting the first core 46 into the first cavity 28 and the second core 48 into the second cavity 30. The mold material is now injected into the first cavity 28 and the second cavity 30, thereby producing one outer container 14 and one inner container 16. The injection molding machine $10_3$ is now opened and the inner container 16 is withdrawn from the second cavity 30 by the second core 48. The index plate 40 is now rotated counterclockwise into a first rotational direction by 120° so that the second core 48 is axially aligned with the first cavity 28 and the first core 46 is axially aligned with the additional cavity 60. The injection molding machine $10_3$ is now closed and the joint material is injected into the first cavity 28 through the further injection gate 36, thereby completing one first double walled drinking vessel 12. After curing the injection molding machine $10_3$ is opened and the completed double walled drinking vessel 12 is ejected. The index plate 40 is rotated by 120° into a second rotational direction opposite the first rotational direction and the described steps are conducted again. In this embodiment one completed double walled drinking vessel 12 is ejected every second time the injection molding machine $10_3$ is opened.

Figure 13:
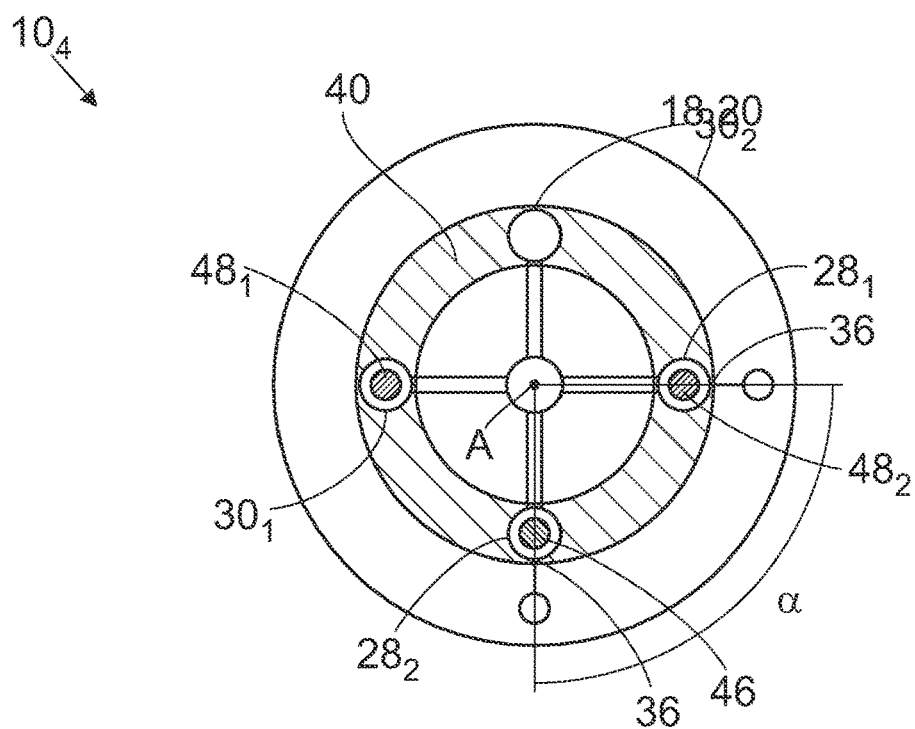
FIG. 13 is a fourth embodiment of the injection molding machine, by means of principle sketches.

In FIG. 13 a fourth embodiment of an injection molding machine $10_4$ is shown by means of a principle sketch. The first mold portion 20 comprises in total four cavities, namely two first cavities $28_1$, $28_2$ and two second cavities $30_1$, $30_2$. The cavities 28, 30 are equally arranged around the central axis A. The first cavities $28_1$, $28_2$ form a first cavity pair 28P and the second cavities $30_1$, $30_2$ form a second cavity pair 30P. The two first cavities $28_1$, $28_2$ enclose an angle α of 90° with each other with reference to the central axis A. The same is true for the second cavities $30_1$, $30_2$.

The index plate 40 comprises one first core 46 and two second cores $48_1$, $48_2$, the two second cores $48_1$, $48_2$ arranged opposite the central axis A and thus enclosing an angle of 180° with reference to the central axis A. The first core 46 is arranged in an angle of 90° with regard to the second cores $48_1$, $48_2$ and with reference to the central axis A.

The index plate 40 is rotated into a position in which the first core 46 is axially aligned with one of the first cavities 28, in this case with the first cavity $28_2$ and the second core $48_1$ is axially aligned with one of the second cavities 30, in this case with the second cavity $30_1$. The other second core $48_2$ is axially aligned with the other first cavity $28_1$. The injection molding machine $10_4$ is now closed and the mold material is injected into the first cavity $28_2$ into which the first core 46 is introduced and into the second cavity $30_1$ into which the second core $48_1$ is introduced, thereby producing an outer container 14 and one inner container 16. After that the injection molding machine $10_4$ is opened and the index plate 40 rotated by 90° counterclockwise into a first rotational direction so that the second core $48_1$ carrying the inner container 16 is axially aligned with the first cavity $28_2$ and the first core 46 is axially aligned with the other first cavity $28_1$. The other second core $48_2$ is now axially aligned with the other second cavity $30_2$. The injection molding machine $10_4$ is now closed and the joint material is injected into the first cavity $28_2$ through the further injection gate 36, thereby completing one double walled drinking vessel 12. At the same time the mold material is injected into the other first cavity $28_1$ and the second cavity $30_2$, thereby producing an outer container 14 and an inner container 16. The injection molding machine $10_4$ is opened and the completed double walled drinking vessel 12 is ejected. The index plate 40 is rotated by 90° in a second rotational direction opposite to the first rotational direction. The inner container 16 is introduced into the outer container 14 and the joint material is injected into the other first cavity $28_1$ through the further injection gate 36, thereby completing a double walled drinking vessel 12. Concomitantly molding material is injected into the first cavity $28_2$ into which the first core 46 is introduced and into the second cavity $30_1$ into which the second core $48_1$ is introduced, thereby producing an outer container 14 and an inner container 16. Now the described steps are repeated.

In this embodiment one completed double walled drinking vessel 12 is ejected each time the injection molding machine $10_4$ is opened.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

REFERENCE LIST

10, $10_1$-$10_4$ injection molding machine
12 double walled drinking vessel
14 outer container
16 inner container
18 injection mold
20 first mold portion
22 second mold portion
24 guide rod
26 driving means
28, $28_1$-$28_4$ first cavity
30, $30_1$-$30_2$ second cavity
32 first cavity injection gate
34 second cavity injection gate
36 further injection gate
38 manifold
40 index plate
42 control unit
44 rotary drive means
46, $46_1$-$46_2$ first core
48, $48_1$-$48_4$ second core
50 preload element
52 holding means
54 suction means
56 annular space
58 hollow space
60 additional cavity
A central axis
P arrow

What is claimed is:

1. A method for producing a double walled drinking vessel, the double walled drinking vessel comprising an outer container and an inner container using an injection mold machine having an injectin mold comprising a first mold portion, a second mold portion facing the first mold portion, the first mold portion and the second mold portion being axially movable relative to each other, the first mold portion forming a first cavity corresponding to an outer shape of the outer container and a second cavity corresponding to an outer shape of the inner container, the first cavity and the second cavity located concentrically with respect to a central axis of the first mold portion, an index plate rotatable around and axially movable along the central axis relative to the first mold portion, the index plate comprising a first core corresponding to an inner shape of the outer container and a second core corresponding to an inner shape of the inner container, and a preload element configured to force the first core into a position in which the first core maximally protrudes from the index plate, the first cavity having a first cavity injection gate for injecting a first mold material into the first cavity for forming the outer container, the second cavity having a second cavity injection gate for injecting a second mold material into the second cavity for forming the inner container, and the first cavity having a further injection gate for injecting a joint material for joining the outer container and the inner container, the method comprising:
rotating the index plate into a position in which the first core is axially aligned with the first cavity and the second core is axially aligned with the second cavity, the first core being forced into the maximally protruding position from the index plate via the preload element,
closing the injection mold by axially moving the first mold portion relative to the second mold portion, thereby inserting the first core into the first cavity and the second core into the second cavity,
injecting the first mold material into the first cavity through the first cavity injection gate, thereby forming an outer container,
injecting the second mold material into the second cavity through the second cavity injection gate, thereby forming an inner container,
opening the injection mold by axially moving the first mold portion relative to the second mold portion, such that the outer container remains in the first cavity and the inner container is removed from the second cavity by the second core,
rotating the index plate into a position in which the second core holding the inner container is axially aligned with the first cavity comprising the outer container,
closing the injection mold, thereby inserting the inner container into the outer container,
joining the outer container and the inner container by injecting the joint material through the further injection gate of the first cavity, and
opening the injection mold and ejecting the double walled drinking vessel.

2. The method according to claim 1, comprising the further steps:
rotating the index plate into a position in which two first cores of the first core are axially aligned with two first cavities of the first cavity, two second cores of the second core are axially aligned with two second cavities of the second cavity and two remaining second cores of the second core are axially aligned with two remaining first cavities of the first cavity,
closing the injection mold by axially moving the first mold portion relative to the second mold portion, thereby inserting the first cores into the first cavities, the two second cores into the two second cavities and the two remaining second cores into the two remaining first cavities,
injecting the first mold material into the first cavity into which the two first cores are inserted through the first cavity injection gate, thereby forming two outer containers,
injecting the second mold material into the second cavity into which the two second cores are inserted through the second cavity injection gate, thereby forming two inner containers,
opening the injection mold by axially moving the first mold portion relative to the second mold portion, such that the two outer containers remain in the first cavity and the two inner containers are removed from the second cavity by the second core,
rotating the index plate forward by 45° into a position in which the second core holds the two inner containers, the two inner containers being axially aligned with the two first cavities comprising the two outer containers, the two first cores are axially aligned with the two first cavities and the two remaining second cores are axially aligned with the two second cavities,
closing the injection mold, thereby inserting the two inner containers into the two outer containers, inserting the first core into the first cavity and inserting the two remaining second cores into the second cavities,
joining the outer container and the inner container by injecting the joint material through the further injection gate of the first cavity,
injecting the first mold material into the first cavity into which the two first cores are inserted through the first cavity injection gate, thereby forming two outer containers,
injecting the second mold material into the second cavities into which the second cores are inserted through the second cavity injection gate, thereby forming two inner containers,
opening the injection mold such that the two outer containers remain in the first cavity and the two inner containers are removed from the second cavity by the second cores,
ejecting the two double walled drinking vessels,
rotating the index plate backward by 45° into a position in which the second core holds the two inner containers are axially aligned with the two first cavities comprising the two outer containers, the two first cores are axially aligned with the two first cavities and the two remaining second cores are axially aligned with the two second cavities, and
closing the injection mold and starting from the beginning again.

3. A method for producing a double walled drinking vessel, the double walled drinking vessel comprising an outer container and an inner container using an injection mold machine having an injectin mold comprising a first mold portion, a second mold portion facing the first mold portion, the first mold portion and the second mold portion being axially movable relative to each other, the first mold portion forming a first cavity corresponding to an outer shape of the outer container and a second cavity corresponding to an outer shape of the inner container, the first cavity and the second cavity located concentrically with respect to a central axis of the first mold portion, an index plate rotatable around and axially movable along the central axis relative to the first mold portion, the index plate comprising a first core corresponding to an inner shape of the outer container and a second core corresponding to an inner shape of the inner container, the first cavity having a first cavity injection gate for injecting a first mold material into the first cavity for forming the outer container, the second cavity having a second cavity injection gate for injecting a second mold material into the second cavity for forming the inner container, and the first cavity having a further injection gate for injecting a joint material for joining the outer container and the inner container, the method comprising:
rotating the index plate into a position in which the first core is axially aligned with the first cavity and the second core is axially aligned with the second cavity,
closing the injection mold by axially moving the first mold portion relative to the second mold portion, thereby inserting the first core into the first cavity and the second core into the second cavity, injecting the first mold material into the first cavity through the first cavity injection gate, thereby forming an outer container, injecting the second mold material into the second cavity through the second cavity injection gate, thereby forming an inner container, opening the injection mold by axially moving the first mold portion relative to the second mold portion, such that the outer container remains in the first cavity and the inner container is removed from the second cavity by the second core, rotating the index plate into a position in which the second core holding the inner container is axially aligned with the first cavity comprising the outer container, closing the injection mold, thereby inserting the inner container into the outer container, joining the outer container and the inner container by injecting the joint material through the further injection gate of the first cavity, opening the injection mold and ejecting the double walled drinking vessel, rotating the index plate into a position in which two first cores of the first core are axially aligned with two first cavities of the first cavity, two second cores of the second core are axially aligned with two second cavities of the second cavity and two remaining second cores of the second core are axially aligned with two remaining first cavities of the first cavity, closing the injection mold by axially moving the first mold portion relative to the second mold portion, thereby inserting the first cores into the first cavities, the two second cores into the two second cavities and the two remaining second cores into the two remaining first cavities, injecting the first mold material into the first cavity into which the two first cores are inserted through the first cavity injection gate, thereby forming two outer containers, injecting the second mold material into the second cavity into which the two second cores are inserted through the second cavity injection gate, thereby forming two inner containers, opening the injection mold by axially moving the first mold portion relative to the second mold portion, such that the two outer containers remain in the first cavity and the two inner containers are removed from the second cavity by the second core, rotating the index plate forward by 45° into a position in which the second core holds the two inner containers, the two inner containers being axially aligned with the two first cavities comprising the two outer containers, the two first cores are axially aligned with the two first cavities and the two remaining second cores are axially aligned with the two second cavities, closing the injection mold, thereby inserting the two inner containers into the two outer containers, inserting the first core into the first cavity and inserting the two remaining second cores into the second cavities, joining the outer container and the inner container by injecting the joint material through the further injection gate of the first cavity, injecting the first mold material into the first cavity into which the two first cores are inserted through the first cavity injection gate, thereby forming two outer containers, injecting the second mold material into the second cavities into which the second cores are inserted through the second cavity injection gate, thereby forming two inner containers, opening the injection mold such that the two outer containers remain in the first cavity and the two inner containers are removed from the second cavity by the second cores, ejecting the two double walled drinking vessels, rotating the index plate backward by 45° into a position in which the second core holds the two inner containers are axially aligned with the two first cavities comprising the two outer containers, the two first cores are axially aligned with the two first cavities and the two remaining second cores are axially aligned with the two second cavities, and closing the injection mold and starting from the beginning again.

* * * * *